US008639098B2

(12) United States Patent
Mae et al.

(10) Patent No.: US 8,639,098 B2
(45) Date of Patent: Jan. 28, 2014

(54) APPARATUS, METHOD, AND COMPUTER PROGRAM FOR PROCESSING INFORMATION

(75) Inventors: Atsushi Mae, Kanagawa (JP); Kenichiro Aridome, Kanagawa (JP); Yukio Isobe, Kanagawa (JP); Naoki Morimoto, Tokyo (JP)

(73) Assignee: Sony Corporation (JP)

( * ) Notice: Subject to any disclaimer, the term of this patent is extended or adjusted under 35 U.S.C. 154(b) by 1149 days.

(21) Appl. No.: 11/821,530

(22) Filed: Jun. 21, 2007

(65) Prior Publication Data

US 2008/0131091 A1 Jun. 5, 2008

(30) Foreign Application Priority Data

Jun. 23, 2006 (JP) ................................ P2006-173754

(51) Int. Cl.
*H04N 5/92* (2006.01)

(52) U.S. Cl.
USPC ........................................... 386/326; 386/353

(58) Field of Classification Search
USPC ................................................... 386/326, 353
See application file for complete search history.

(56) References Cited

U.S. PATENT DOCUMENTS

| | | | | |
|---|---|---|---|---|
| 5,730,124 | A * | 3/1998 | Yamauchi | 600/300 |
| 6,885,367 | B1 * | 4/2005 | Fujieda | 345/420 |
| 2003/0169661 | A1 | 9/2003 | Nozaki | |
| 2004/0179102 | A1 * | 9/2004 | Matsufune | 348/207.1 |
| 2005/0058434 | A1 * | 3/2005 | Nakashika et al. | 386/95 |
| 2006/0147183 | A1 | 7/2006 | Mae et al. | |
| 2007/0025199 | A1 * | 2/2007 | Suzuki | 369/30.07 |
| 2007/0050414 | A1 * | 3/2007 | Yoshida et al. | 707/200 |
| 2009/0003172 | A1 * | 1/2009 | Yahata et al. | 369/53.41 |

FOREIGN PATENT DOCUMENTS

| | | | |
|---|---|---|---|
| EP | 942426 | | 9/1999 |
| EP | 1667153 | A1 | 6/2006 |
| EP | 1672534 | A1 | 6/2006 |
| JP | 2004-318923 | A | 11/2004 |
| JP | 2006-190357 | A | 7/2006 |
| WO | 2005001832 | | 1/2005 |

OTHER PUBLICATIONS

European Search Report, EP 07 11 0734.
European Search Report, EP 07 11 0734, Date: Aug. 8, 2013.
Office Action from Korean Application No. 10-2007-0060351, dated Jul. 22, 2013.

* cited by examiner

*Primary Examiner* — Thai Tran
*Assistant Examiner* — Jose Mesa
(74) *Attorney, Agent, or Firm* — Lerner, David, Littenberg, Krumholz & Mentlik, LLP

(57) ABSTRACT

An information processing apparatus includes a controller for controlling data recording to an information recording medium. The controller updates a command storage file storing a command set in response to AV stream data to be recorded on the information recording medium and an index file storing index information and then records the updated command storage file and the updated index file on the information recording medium, the command storage file and the index file being updated and recorded in response to a determination that a predetermined update timing different from the timings of the recording of the AV stream data onto the information recording medium and the editing of the recorded AV stream data is reached.

9 Claims, 22 Drawing Sheets

FIG. 13

| | Syntax | No. of bits | Mnemonic |
|---|---|---|---|
| | Index. bdmv{ | | |
| | TypeIndicator | 8*4 | bslbf |
| | TypeIndicator2 | 8*4 | bslbf |
| | IndexeStartAddress | 32 | uimsbf |
| | ExtensionDataStartAddress | 32 | uimsbf |
| | reserved | 192 | bslbf |
| | ApplInfoBDMV() | | |
| | for (i=0;i<N1;i++){ | | |
| | padding_word | 16 | bslbf |
| | } | | |
| 301 | Indexes() | | |
| | for (i=0;i<N2;i++){ | | |
| | padding_word | 16 | bslbf |
| | } | | |
| 302 | blkExtensionData() | | |
| | for (i=0;i<N3;i++){ | | |
| | padding_word | 16 | bslbf |
| | } | | |
| | } | | |

FIG. 14

| | Syntax | No. of bits | Mnemonic |
|---|---|---|---|
| | Indexes() { | | |
| | length | 32 | uimsbf |
| 311 | FirstPlayback() { | | |
| 311 | '01' | 2 | uimsbf |
| 311 | reserved | 30 | bslbf |
| 311 | AVCHDTitlePlaybackType <01> | 2 | uimsbf |
| 311 | reserved | 14 | bslbf |
| 311 | FirstPlayback_mobj_id_ref <0000> | 16 | uimsbf |
| 311 | reserved | 8*4 | bslbf |
| 312 | TopMenu() { | | |
| 312 | '01' | 2 | uimsbf |
| 312 | reserved | 30 | bslbf |
| 312 | '01' | 2 | uimsbf |
| 312 | reserved | 14 | bslbf |
| 312 | TopMenu_mobj_id_ref <0000> | 16 | uimsbf |
| 312 | reserved | 8*4 | bslbf |
| | } | | |
| | number_of_Titles <4> | 16 | uimsbf |
| | for(title_id=0; | | |
| | title_id<number_of_Titles; | 16 | bslbf |
| | title_id++){ | | |
| | Title[title_id]() { | | |
| | '01' | 2 | uimsbf |
| | '00' | 2 | uimsbf |
| | reserved | 28 | bslbf |
| | '00' | 2 | uimsbf |
| | reserved | 14 | bslbf |
| | Title_mobj_id_ref[title_id] <0001 to 0004> | 16 | uimsbf |
| | reserved | 8*4 | bslbf |
| | } | | |
| | } | | |
| | } | | |

FIG. 15

| Syntax | No. of bits | Mnemonic |
|---|---|---|
| ExtensionData() { | | |
| length | 32 | uimsbf |
| if(length !=0) { | | |
| data_block_start_address | 32 | uimsbf |
| reserved | 24 | bslbf |
| number_of_ext_data_entries <1> | 8 | uimsbf |
| for (i=0;i<number_of_ext_data_entries;i++) { | | |
| ext_data_entry() { | | |
| ID1 < XXXX (REPRESENTING AVCHD) > | 16 | uimsbf |
| ID2 < XXXX (REPRESENTING VERSION) > | 16 | uimsbf |
| ext_data_start_address | 32 | uimsbf |
| ext_data_length | 32 | uimsbf |
| } | | |
| } | | |
| for (i=0<;i<L1;i++) { | | |
| padding_word | 16 | bslbf |
| padding_word | 16 | bslbf |
| } | | |
| 321 data_block | 32+ 8 * (length − data_block_start_address) | |
| } | | |
| } | | |

FIG. 16

| | Syntax | No. of bits | Mnemonic |
|---|---|---|---|
| | indexExtensionData() { | | |
| | type__indicator | 8*4 | uimsbf |
| | reserved | 8*4 | bslbf |
| | TableOfPlayLists__start__address | 32 | uimsbf |
| | MakersPrivateData__start__address | 32 | uimsbf |
| | reserved__for__future__use | 192 | bslbf |
| 351 | UIAppinfoAVCHD() | | |
| | for (i=0;i<N1;i++) { | | |
| | padding__word | 16 | bslbf |
| | } | | |
| 352 | TableOfPlayLists() | | |
| | for (i=0;i<N2;i++) { | | |
| | padding__word | 16 | bslbf |
| | } | | |
| 353 | MakersPrivateData() | | |
| | for (i=0;i<N3;i++) { | | |
| | padding__word | 16 | bslbf |
| | } | | |
| | } | | |

FIG. 17

| Syntax | | No. of bits | Mnemonic |
|---|---|---|---|
| UIAppInfoAVCHD() { | | | |
| length | | 32 | uimsbf |
| maker_ID | < XXXX (REPRESENTING MAKER) > | 16 | uimsbf |
| maker_model_code | < XXXX (REPRESENTING APPARATUS) > | 16 | uimsbf |
| maker_private_area | <ALL0> | 8*32 | bslbf |
| reserved_for_future_use | | 15 | bslbf |
| AVCHD_write_protect_flag | <0> | 1 | bslbf |
| ref_to_menu_thumbnail_index | <0xFFFF> | 16 | uimsbf |
| time_zone | < LAST UPDATE TIME > | 8 | bslbf |
| record_time_and_date | < LAST UPDATE TIME > | 4*14 | bslbf |
| reserved_for_future_use | | 8 | bslbf |
| AVCHD_character_set | <0x90> | 8 | bslbf |
| AVCHD_name_length | <0> | 8 | uimsbf |
| AVCHD_name | <ALL0> | 8*255 | bslbf |
| Additional_data() { | | | |
| length2 | | 32 | uimsbf |
| reserved_for_future_use | | length2 | bslbf |
| } | | | |
| } | | | |

FIG. 18

371 (FirstPlayback_PlayLists() / TopMenu_PlayLists() / number_of_Title_PlayList_pair)

| Syntax | No. of bits | Mnemonic |
|---|---|---|
| TableOfPlayLists() { | | |
| length | 32 | uimsbf |
| FirstPlayback_PlayLists() | | |
| TopMenu_PlayLists() | | |
| number_of_Title_PlayList_pair <4> | 16 | bslbf |
| for (i=0;i<number_of_Title_PlayList_pair++) { | | |
| Title_PlayList_pair | | |
| PlayList_file_name < PLAY LIST FILE NUMBER > | 8*5 | bslbf |
| reserved_for_future_use | 6 | bslbf |
| PlayList_attribute <01, 10> | 2 | uimsbf |
| reserved_for_future_use | 14 | bslbf |
| ref_to_title_id < PLAY ORDER INFORMATION > | 16 | uimsbf |
| } | | |
| } | | |

FIG. 19

| Syntax | No. of bits | Mnemonic |
|---|---|---|
| FirstPlayback__PlayLists/TopMenu__PlayLists(){ | | |
| Length | 32 | uimsbf |
| number__of__PLayLists <0> | 16 | uimsbf |
| for (i=0;i<number__of__PlayLists++){ | | |
| PlayList__file__name | 8*5 | bslbf |
| reserved__for__future__use | 8 | bslbf |
| } | | |
| } | | |

FIG. 20

| Syntax | No. of bits | Mnemonic |
|---|---|---|
| MakersPrivateData(){ | | |
| length <0> | 32 | uimsbf |
| if(length !=0){ | | |
| data__block__start__address | 32 | uimsbf |
| reserved__for__word__align | 24 | bslbf |
| number__of__maker__entries | 8 | uimsbf |
| for (i=0;i<number__of__maker__entries;i++){ | | |
| maker__ID | 16 | uimsbf |
| maker__model__code | 16 | uimsbf |
| mpd__start__address | 32 | uimsbf |
| mpd__length | 32 | uimsbf |
| } | | |
| for (i=0<;i<L1;i++){ | | |
| padding__word | 16 | bslbf |
| padding__word | 16 | bslbf |
| } | | |
| data__block | 32+ 8*(length− data__block__ start__address) | |
| } | | |
| } | | |

FIG. 21

| Syntax | No. of bits | Mnemonic |
|---|---|---|
| MovieObject. bdmv{ | | |
| TypeIndicator | 8*4 | bslbf |
| TypeIndicator2 | 8*4 | bslbf |
| ExtensionDataStartAddress | 32 | uimsbf |
| reserved | 224 | bslbf |
| 401 MovieObjects() | | |
| for (i=0;i<N1;i++){ | | |
| padding_word | 16 | bslbf |
| } | | |
| blkExtensionData() | | |
| for (i=0;i<N2;i++){ | | |
| padding_word | 16 | bslbf |
| } | | |
| } | | |

FIG. 22

| Syntax | No. of bits | Mnemonic |
|---|---|---|
| blkMovieObjects() { | | |
| Length | 32 | uimsbf |
| reserved | 32 | bslbf |
| NumberOfmobjs <5> | 16 | uimsbf |
| for(mobj__id=0; mobj__id<NumberOfmobjsmobj__id++) { | | |
| MovieObject[mobj__id]() { | | |
| TerminalInfo() { | | |
| '1' | 1 | bslbf |
| '0' | 1 | bslbf |
| '0' | 1 | bslbf |
| reserved | 13 | bslbf |
| } | | |
| number of navigation commands{mobj id} <4, 1, 1, 1, 1> | 16 | uimsbf |
| for(command__id=0; command_id<number_of_navigation_commands[mobj_id]; command id++){ <PlayPL#XXXX> | | |
| navigation commands{mobj id}[command_id] | 96 | bslbf |
| } | | |
| } | | |
| } | | |
| } | | |

APPARATUS, METHOD, AND COMPUTER PROGRAM FOR PROCESSING INFORMATION

CROSS-REFERENCE TO RELATED APPLICATIONS

The present application claims priority from Japanese Patent Application No. JP 2006-173754, filed in the Japanese Patent Office on Jun. 23, 2006, the entire content of which is incorporated herein by reference.

BACKGROUND OF THE INVENTION

1. Field of the Invention

The present invention relates to an information processing apparatus, an information processing method and a computer program. More specifically, the present invention relates to an information processing apparatus, an information processing method and a computer program for performing efficient data processing by eliminating a process in the recording of content such as a moving image onto an information recording medium or the editing of the content recorded on the information recording medium and for reliably reproducing data by performing an information update process at a particular timing.

2. Description of the Related Art

As the recording capacity of disk-type recording media increases, video cameras storing moving images or still images on a disk instead of the known recording tape are commercially available. Since the disk-type recording medium is used in a random-access fashion, any desired scene can be efficiently found from recorded data. Since the disk-type recording medium operates in a non-contact fashion, data accessing to the disk is performed in a manner free from physical wear. For example, digital versatile disk (DVD) video cameras are in widespread use because of the user friendliness thereof such as high image quality and ease of editing.

When content such as a moving image is recorded onto the information recording medium, information such as a command applicable to the playing of recorded content, and title information, different from actual audio-visual (AV) stream data, is also recorded. More specifically, a command storage file containing a command for specifying a play order and a play start position of the stream and an index file for causing a user to recognize the play order and title specified by the command storage file need to be updated in response to a recording process of new content or an editing process of recorded content.

If one of the command storage file and the index file is updated and maintained each time one of the recording process and the editing process is performed, performance of apparatus may drop. If the information recording medium is unloaded without maintaining these files, the information recording medium not only violates format standard, but also cannot be reproduced correctly.

SUMMARY OF THE INVENTION

It is desirable to provide an information processing apparatus, an information processing method, and a computer program for performing efficient data processing by eliminating a process in the recording of content such as a moving image onto an information recording medium or the editing of the content recorded on the information recording medium and for reliably reproducing data by performing an information update process at a particular timing.

It is also desirable to provide an information processing apparatus, an information processing method, and a computer program for achieving high process efficiency, medium degradation prevention, and reliable content reproducing by updating a command storage file "MovieObject.bdmv" defined in the AVCHD format and an index file "Index.bdmv" at a particular predetermined timing instead of at the timing of recording of content or at the timing of editing content recorded on the information recording medium.

In accordance with one embodiment of the present invention, an information processing apparatus includes a controller for controlling data recording to an information recording medium. The controller updates a command storage file storing a command set in response to AV stream data to be recorded on the information recording medium and an index file storing index information and then records the updated command storage file and the updated index file on the information recording medium, the command storage file and the index file being updated and recorded in response to a determination that a predetermined update timing different from the timings of the recording of the AV stream data onto the information recording medium and the editing of the recorded AV stream data is reached.

The controller may detect at least one of timings of an ejection of the information recording medium, of a connection of the information processing apparatus to an external device via an input-output interface, of an unmount of the information recording medium, and of a power-off of the information processing apparatus, and update and then record the command storage file and the index file onto the information recording medium in response to a detection result.

The controller may update the command storage file and the index file to store data consistent with all AV streams recorded on the information recording medium, and then record the updated command storage file and the updated index file onto the information recording medium.

The command storage file may include a movie object file defined by an AVCHD format, and the index file may be defined by the AVCHD format.

In accordance with one embodiment of the present invention, an information processing method includes a step of controlling data recording to an information recording medium. The controlling step includes updating a command storage file storing a command set in response to AV stream data to be recorded on the information recording medium and an index file storing index information and then recording the updated command storage file and the updated index file on the information recording medium, the command storage file and the index file being updated and recorded in response to a determination that a predetermined update timing different from the timings of the recording of the AV stream data onto the information recording medium and the editing of the recorded AV stream data is reached.

The controlling step may include detecting at least one of timings of an ejection of the information recording medium, of a connection of the information processing apparatus to an external device via an input-output interface, of an unmount of the information recording medium, and of a power-off of the information processing apparatus, and updating and then recording the command storage file and the index file onto the information recording medium in response to a detection result.

The controlling step may include updating the command storage file and the index file to store data consistent with all AV streams recorded on the information recording medium, and then recording the updated command storage file and the updated index file onto the information recording medium.

The command storage file may include a movie object file defined by an AVCHD format, and the index file may be defined by the AVCHD format.

In accordance with one embodiment of the present invention, a computer program for causing a computer to process information, include a step of controlling data recording to an information recording medium. The controlling step includes updating a command storage file storing a command set in response to AV stream data to be recorded on the information recording medium and an index file storing index information and then recording the updated command storage file and the updated index file on the information recording medium, the command storage file and the index file being updated and recorded in response to a determination that a predetermined update timing different from the timings of the recording of the AV stream data onto the information recording medium and the editing of the recorded AV stream data is reached.

The computer program of one embodiment of the present invention may be supplied, to a computer system performing a variety of program code, in a computer readable format in a recording medium such as a compact disk (CD), a floppy disk (FD), and a magneto-optical (MO) disk, or via a communication medium such as a network. With the program provided in the computer readable format, the computer system performs a process responsive to the computer program.

Theses and other features and advantages of the present invention will be apparent from the following description, and the accompanying drawings. The word “system” in the context of this specification refers to a logical set of a plurality of apparatuses and is not limited to a single casing containing a plurality of apparatuses.

In accordance with embodiments of the present invention, an information processing apparatus such as a video camera updates a movie object MovieObject.bdmv and an index file “Index.bdmv” at any of timings of (a) ejection of a information recording medium, (b) connection of the information processing apparatus to an external device such as a personal computer via an input-output interface, (c) unmount of the information recording medium, and (d) power off of the information processing apparatus. A data recording process and an editing process are thus simplified and performed efficiently and quickly. When a reproducing apparatus reproduces content from the information recording medium, the movie object and the index file are already updated. Content reproducing is reliably performed. The number of file updates is reduced, leading to a reduction in the number of media accesses and an improvement in medium degradation.

BRIEF DESCRIPTION OF THE DRAWINGS

FIG. 13 illustrates a syntax of an index file in accordance with one embodiment of the present invention;

FIG. 14 illustrates a syntax of a index information block of the index file in accordance with one embodiment of the present invention;

FIG. 15 illustrates a syntax of an extension information block of the index file in accordance with one embodiment of the present invention;

FIG. 16 illustrates data of the extension information block of the index file in accordance with one embodiment of the present invention;

FIG. 17 illustrates data of the extension information block of the index file in accordance with one embodiment of the present invention;

FIG. 18 illustrates data of the extension information block of the index file in accordance with one embodiment of the present invention;

FIG. 19 illustrates data of the extension information block of the index file in accordance with one embodiment of the present invention;

FIG. 20 illustrates data of a maker supply data block in the extension information block of the index file in accordance with one embodiment of the present invention;

FIG. 21 illustrates a syntax of a movie object file in accordance with one embodiment of the present invention; and FIG. 22 illustrates a syntax of a movie object block of the movie object file in accordance with one embodiment of the present invention.

DESCRIPTION OF THE PREFERRED EMBODIMENTS

An information processing apparatus 100, an information processing method and a computer program in accordance with embodiments of the present invention are described below with reference to the drawings.

Figure 1:
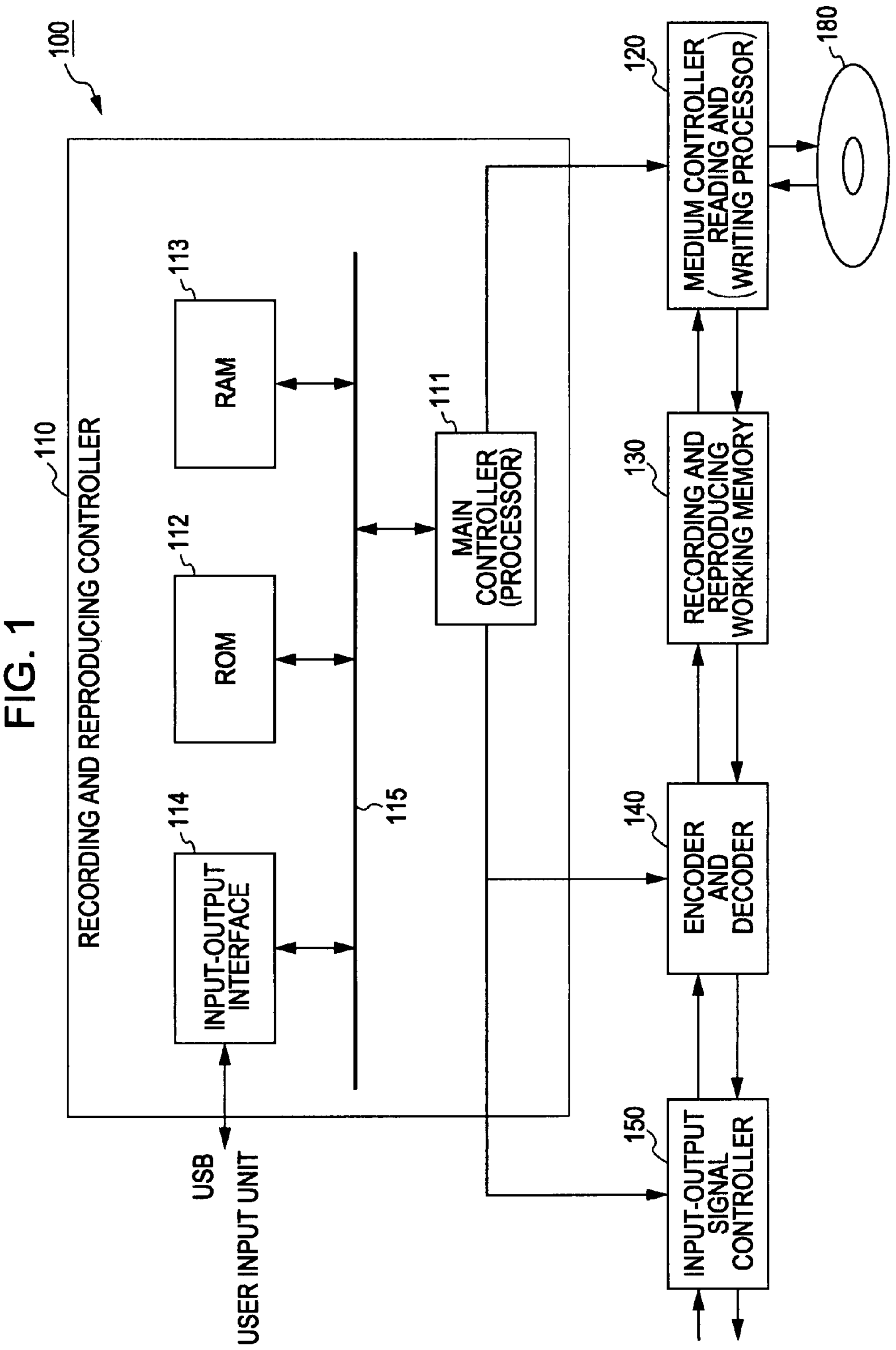
FIG. 1 is a block diagram illustrating an information processing apparatus in accordance with one embodiment of the present invention.

FIG. 1 is a block diagram illustrating the information processing apparatus 100 in accordance with one embodiment of the present invention. The information processing apparatus 100 of FIG. 1 is a video camera. As shown, the information processing apparatus 100 includes a recording and reproducing controller 110, a medium controller (reading and writing processor) 120, a recording and reproducing working memory 130, an encoder and decoder 140 and an input-output signal controller 150. The recording and reproducing controller 110 includes a main controller (processor) 111, a read-only memory (ROM) 112, a random-access memory (RAM) 113, and an input-output interface 114.

The information processing apparatus 100 is designed to record and reproduce a moving image and a still image using an information recording medium 180. The information processing apparatus 100 can generate a file in a moving image format such as AVCHD format (MPEG-4 part 10 Advanced Video Coding (AVC)/H.264), namely, a photo movie based on the still image recorded on the information recording medium 180, and then re-record the photo movie onto the information recording medium 180. The data recording on the information recording medium 180 may be performed in accordance with the AVCHD format. The data recording in accordance with the AVCHD format will be described in detail later.

When data is recorded, the encoder and decoder 140 encodes the moving image or the still image input from the input-output signal controller 150. For example, the encoder and decoder 140 performs the encoding process on a video stream and an audio stream, composed of an input moving image signal, into a multiplexed data stream. The data encoded by the encoder and decoder 140 is stored on the recording and reproducing working memory 130 and then recorded onto the information recording medium 180 under the control of the medium controller 120.

The encoding operation performed by the encoder and decoder 140 during the data recording process becomes different between the moving image and the still image. The information recording medium 180 thus records thereon a moving image file and a still image file.

The recording and reproducing controller 110 controls a data recording process, a data reproducing process, and a photo movie production process performed by the information processing apparatus 100. The recording and reproducing controller 110 includes a main controller 111, a read-only memory (ROM) 112, a random-access memory (RAM) 113, an input-output interface 114 and a bus 115 used to interconnect these elements.

The main controller 111 issues to the encoder and decoder 140 a start command and a stop command to start and stop the encoding process, respectively. The main controller 111 also issues to the medium controller 120 a data read command and a data write command to read data from and write data to the medium controller 120, respectively. The main controller 111 controls a capturing operation of capturing an input signal from the encoder and decoder 140 and an output operation to output a captured input signal to the encoder and decoder 140.

The ROM 112 in the recording and reproducing controller 110 stores a program executed by the main controller 111 and a variety of parameters. The ROM 112 may include an electronically erasable and programmable read-only memory (EEPROM) such as a flash memory. The RAM 113 stores work data required for the main controller 111 to execute the program, and may include one of a static random-access memory (SRAM) and a dynamic random-access memory (DRAM). The input-output interface 114 is connected to a user input unit, a display, or a network and exchanges data and commands with an external device. The input-output interface 114 is used to update the program stored on the ROM 112, for example.

The input-output interface 114 is also used for universal serial bus (USB) connection with a personal computer. Through the USB connection, the application running on a personal computer recognizes the information recording medium 180 loaded on the information processing apparatus as an external storage unit (USB mass storage device) and records and acquire data on the information recording medium 180.

The recording and reproducing controller 110 updates a Movieobject.bdmv file as a command storage file defined by the AVCHD format and an index.bdmv file at predetermined timings, more specifically, at one of timings of:

(a) ejection of the information recording medium 180, (b) USB connection of the recording and reproducing controller 110 with an external device such as a personal computer via the input-output interface 114, (c) unmount of the information recording medium 180, and (d) power off of the information processing apparatus 100.

The information processing apparatus of one embodiment of the present invention does not update the Movieobject.bdmv file and the index.bdmv file at the timings of the content recording and the editing of the recorded content. Since the files are updated at these timings, the update process and the reproducing process of the content are efficiently performed, and medium degradation involved in operation is effectively prevented. The update process will be described in detail later.

Figure 2:
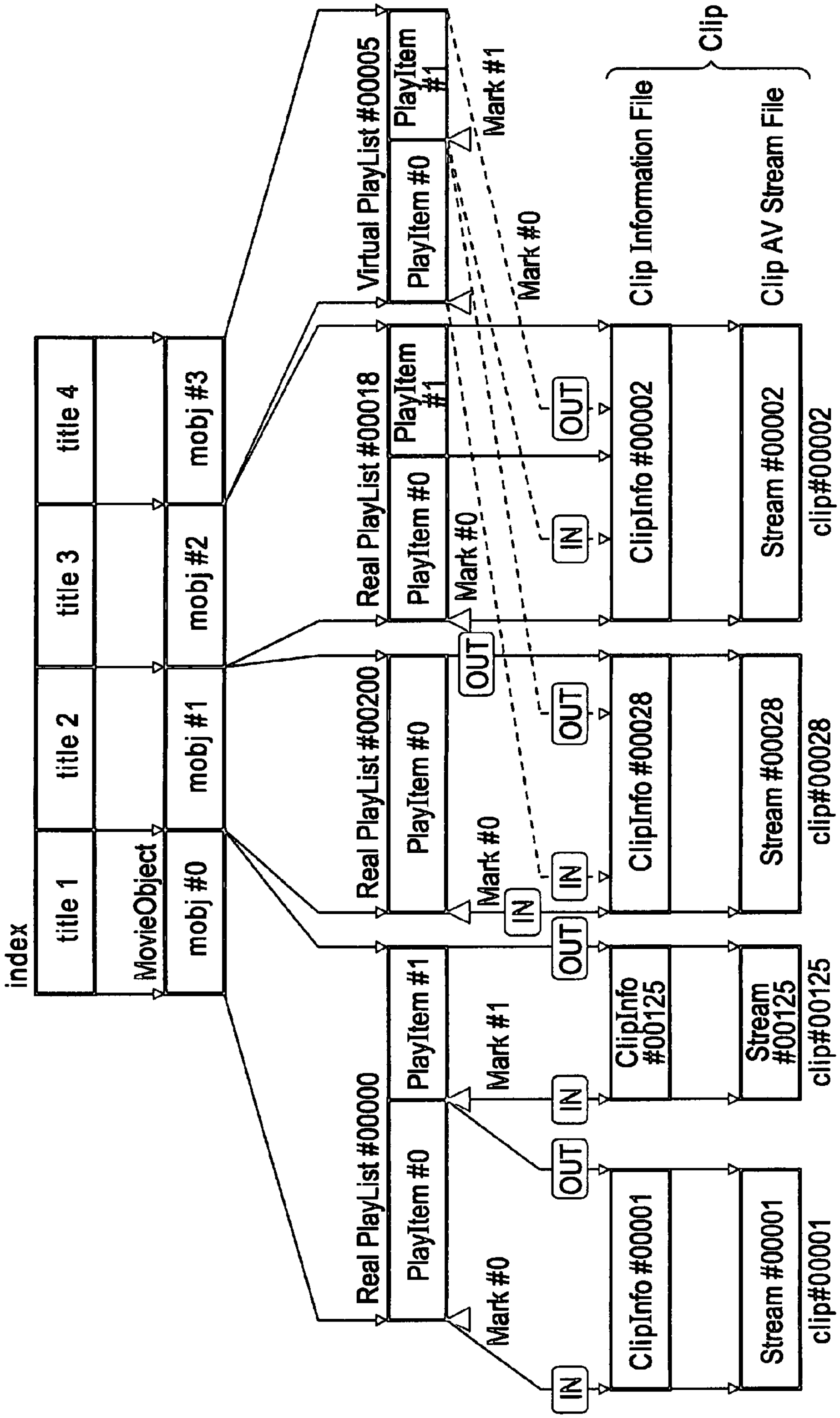
FIG. 2 illustrates a data structure of data recorded on an information recording medium in accordance with one embodiment of the present invention.

FIG. 2 illustrates a data structure of data stored on the information recording medium 180. The data structure to be discussed herein complies with the AVCHD format. As shown in FIG. 2, a moving image stream photographed by the video camera is encoded into an MPEG2-TS stream for recording. Generated and recorded in this case include an index file, a movie object (MovieObject) file, a play list (PlayList) file, a clip information (ClipInformation) file, and a clip AV stream (ClipAVStream) file. Clip information files corresponding to the ClipAVStream of a predetermined data unit are collectively referred to as a clip.

The files are listed below and described in detail.

Index file: Maximum number of index files is one. Function of the index file is as follows: The index file is a root file used to manage the entire medium. The index file manages correspondence between a title shown to a user and a Movieobject file. In accordance with the AVCHD format, the play order of the play lists to be managed by the MovieObject is managed in metadata of the index file.

MovieObject file: Maximum number of MovieObject files is one. Function of the MovieObject file is as follows: the MovieObject file is used to manage the play list that is reproduced when a title is specified in accordance with the BD-ROM format. In accordance with the AVCHD format, the metadata in the index file is used to manage a relationship between the play list and the title without referencing the MovieObject file.

Real PlayList file: Maximum number of total of Real Playlist files and Virtual PlayList files are 2000. The function of the Real PlayList file is as follows: The Real PlayList is the PlayList for the original title. Video recorded and reproduced is registered in the real PlayList file in the order of recording.

Virtual PlayList file: The Virtual Playlist file is a PlayList for producing a user-defined play list through non-destructive editing. The Virtual PlayList has no clip thereof and reproduces data by specifying a clip registered in the Real PlayList file.

Clip Information: Maximum number of Clip Information files is 4000. The Clip Information file is present in pair with the ClipAVStream file, and contains information relating to a stream required for reproducing an actual stream.

Clip AV Stream file: Maximum number of Clip AV Stream files is 4000. The Clip AV Stream file contains a stream recorded in accordance with MPEG2-TS. Video data of AVC is contained in this file.

The index file manages the entire information recording medium 180 by file type layer. An index file is produced for each title shown to a user, and manages a correspondence relationship with the movie object. In accordance with the AVCHD format, the play order of the play lists to be originally managed by a movie object file is managed within the metadata of the index file. When the information recording medium is loaded on a player, the index file is first read. The user can see the title described in the index file.

The MovieObject file is used to manage the play list to be reproduced. A reference to a MovieObject file is listed in the index file as an entry to the title. In accordance with the AVCHD format, the MovieObject file is not referenced and the relationship between the play list and the title is managed by the metadata in the index file.

The PlayList file is arranged in association with the title shown to the user and includes at least one PlayItem. Each PlayItem specifies a play period defined by a play start point (IN point) and a play end point (OUT point) of each clip. The play order of the play periods is specified by arranging a plurality of PlayItems in time axis in the PlayList. PlayItems referencing different clips may be contained in a single PlayList.

The reference relationship between the clip and the PlayList may be freely set. For example, a single clip may be referenced from two PlayLists different in the IN point and the OUT point. The reference relationship may be freely set between the title and the MovieObject. The PlayLists are divided into two major types, namely, a real PlayList and a virtual PlayList depending on the reference relationship with the clip.

The real PlayList is the one for the original title and has PlayItems of video streams, photographed and recorded by the video camera, in the order of recording.

The virtual PlayList is the one for producing a user-defined PlayList through non-destructive editing. The virtual PlayList has no clip (AV stream) thereof and the PlayItem in the virtual PlayList indicates a clip or a portion of the clip registered in any of the real PlayLists. More specifically, the user can extract a required play period from a plurality of clips and edit the PlayItems indicating the periods into a virtual PlayList.

The clipAVStream file stores a stream recorded in the MPEG-TS format on the information recording medium 180. The video data is stored in this file.

The clip information file is present in association with the clipAVStream file and contains information relating to information required to reproduce an actual stream.

As described above, the index file, the MovieObject file, the PlayList file, the CipInformation file, and the clipAVStream file are recorded in accordance with the AVCHD format.

The designates of these files and data are described for exemplary purposes only, and other designates may be used. The content of each file and data are described below:

(1) AV stream (CipAVStream): Content data (2) Clip information (CipInformation): The clip information corresponds to the AV stream on a one-to-one correspondence basis, and defines an attribute of the corresponding AV stream. For example, the CipInformation file contains coding, size, time to address conversion, play management information, time map, etc.

(3) Play item (PlayItem): The play item contains data specifying a play period between a play start point and a play end point of the CipInformation.

(4) Play list (PlayList): The play list contains at least one PlayItem.

(5) Mark: A mark is typically present in the PlayList and indicates time point of play content. A period from one mark to a next mark is typically referred to as a chapter.

(6) Movie object (MovieObject): MovieObject is a set of commands for controlling playing.

(7) Title: Title is a set of PlayLists (recognizable by the user).

In the discussion that follows, data and files having the above-described content are the AV stream (clipAvStream), the clip information (ClipInformation), the play item (PlayItem), the play list (PlayList), the mark, the movie object (MovieObject), and the title. The present invention is applicable to the structure having substantially the same content as described above.

Figure 3:
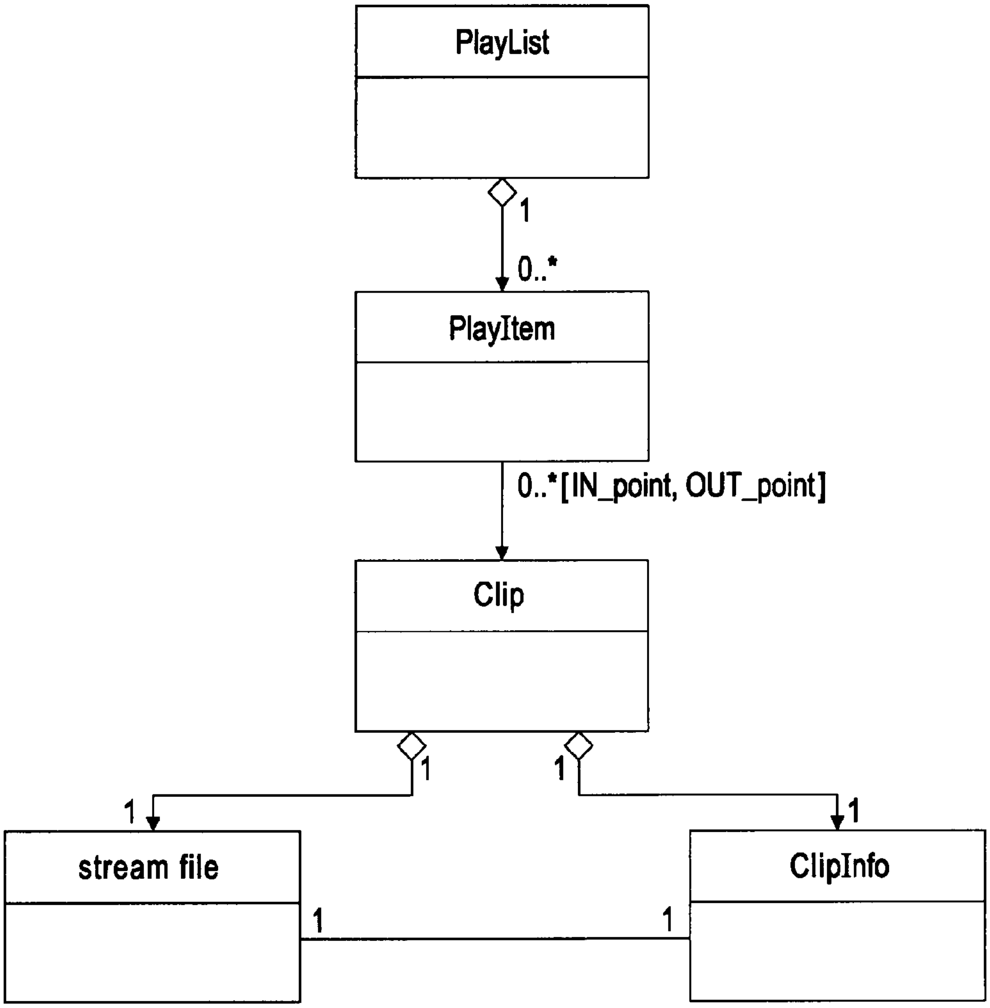
FIG. 3 illustrates a unified modeling language (UML) indicating a PlayList, PlayItem, Clip, ClipInformation, and ClipAVStrem in accordance with one embodiment of the present invention.

FIG. 3 illustrates a unified modeling language (UML) indicating the relationship of the PlayList, the PlayItem, the Clip, the CipInformation, and the clipAVStream discussed with reference to FIG. 2. The PlayList is related to at least one PlayItem, and one PlayItem is related to one clip. A plurality of PlayItems different in the start point and/or the end point may be related to a single clip. A single clipAVStream file can be referenced from a single clip. The clipAVStream file and the CipInformation file are related to each other on a one-to-one correspondence basis. By defining the structure in this way, a non-destructive play order may specified with any portion of the data reproduced without modifying the clipAVStream file.

Figure 4:
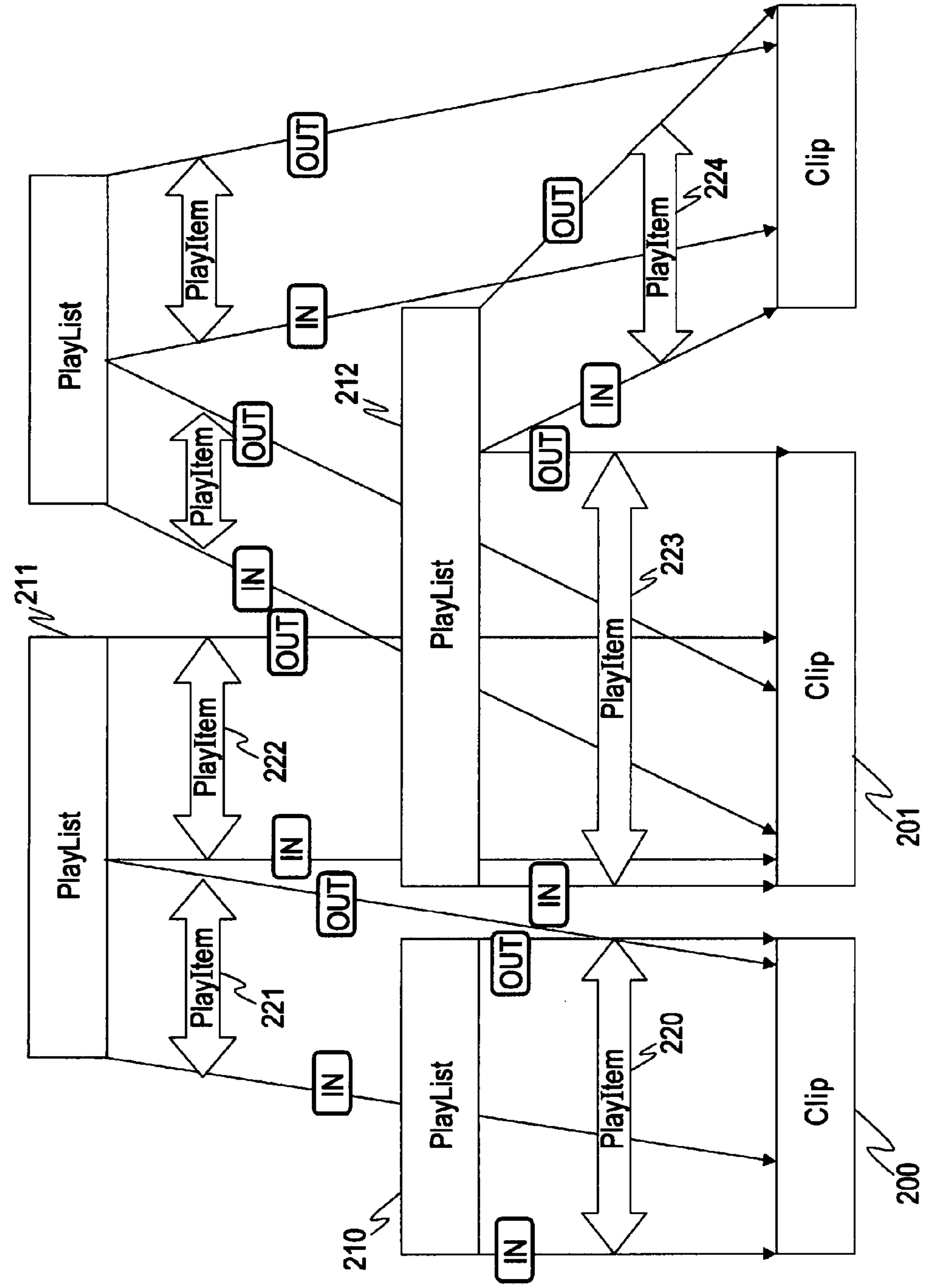
FIG. 4 illustrates a reference relationship of a play list to a clip in accordance with one embodiment of the present invention.

As shown in FIG. 4, the same clip may be referenced from a plurality of PlayLists. A single PlayList may specify a plurality of clips. The clip may be referenced by the IN point and the OUT point indicated by the PlayItem in the PlayList. As shown in FIG. 4, a clip 200 is referenced by a PlayItem 220 in a PlayList 210 while a period defined by the IN point and the OUT point of a PlayItem 221, out of the PlayItems 221 and 222 forming a PlayList 211 is referenced. In a clip 201, a period thereof defined by the IN point and the OUT point of the PlayItem 222 in the PlayList 211 is referenced, and a period thereof defined by the IN point and the OUT point of a PlayItem 223, out of PlayItems 223 and 224 in a PlayList 212 is referenced.

Figure 5:
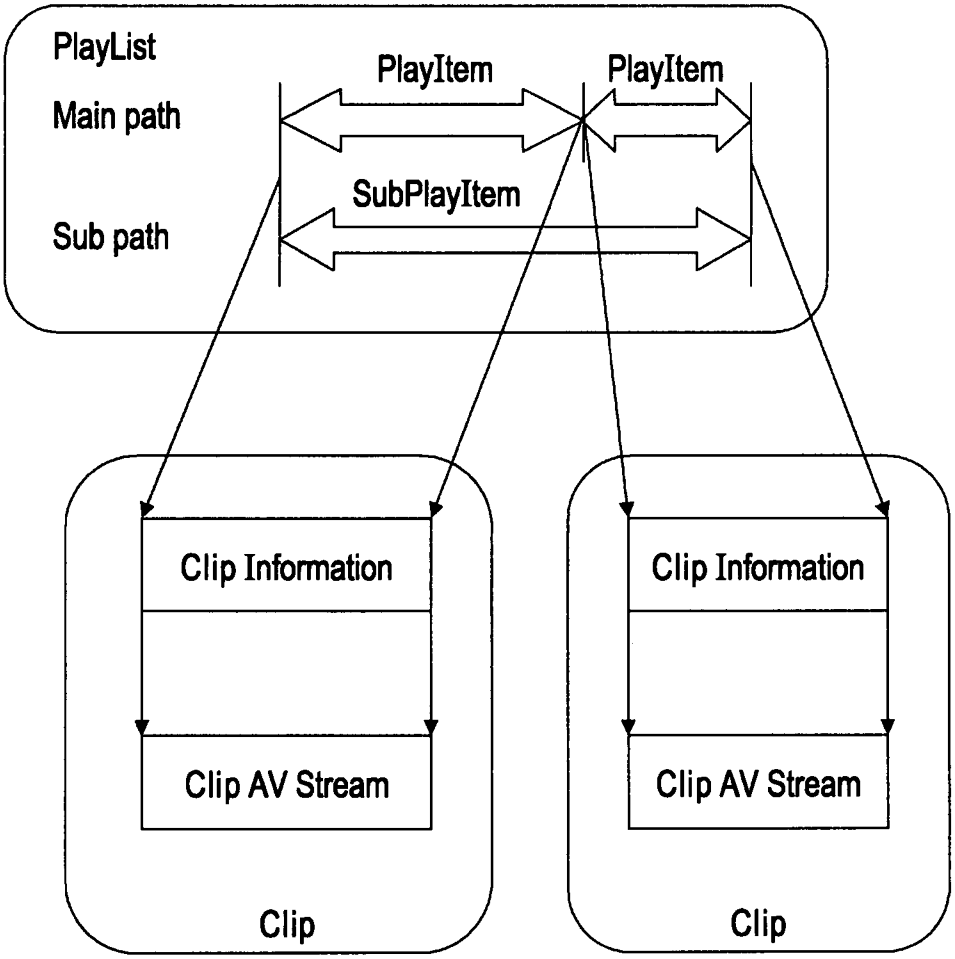
FIG. 5 illustrates a relationship of a main path and a sub path set in the play list, and the clip in accordance with one embodiment of the present invention.

As shown in FIG. 5, the PlayList may have a sub path corresponding to a sub PlayItem in a way similar to the relationship between the main path and the PlayItem to be mainly reproduced. For example, an after-recording PlayItem attached to the PlayList may be contained as a sub PlayItem in the PlayList. As will be described in detail later, the PlayList can contain a sub PlayItem only when a predetermined condition is satisfied.

Figure 6:
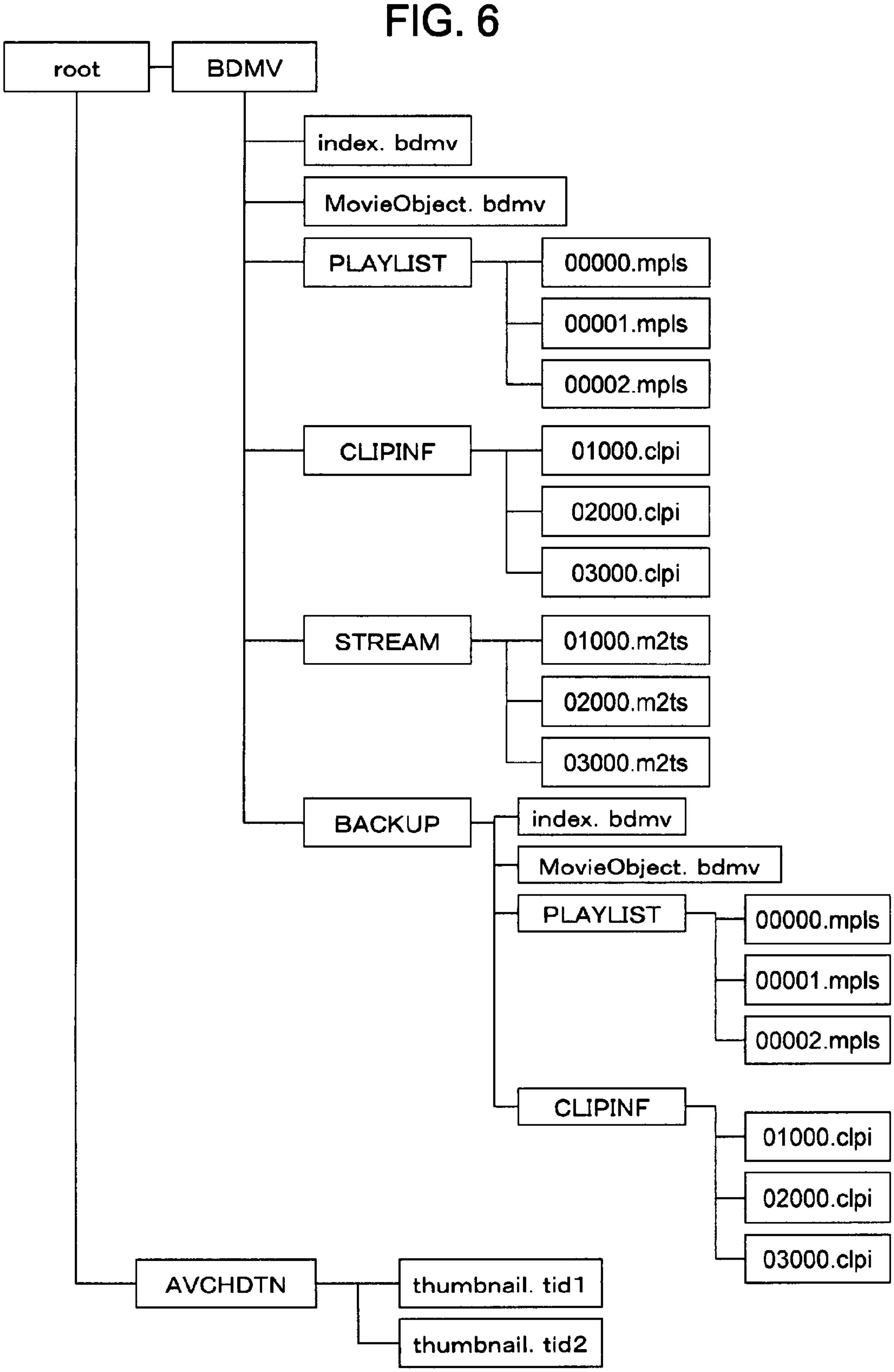
FIG. 6 illustrates a management structure of files recorded on the information recording medium in accordance with one embodiment of the present invention.
Figure 7A:
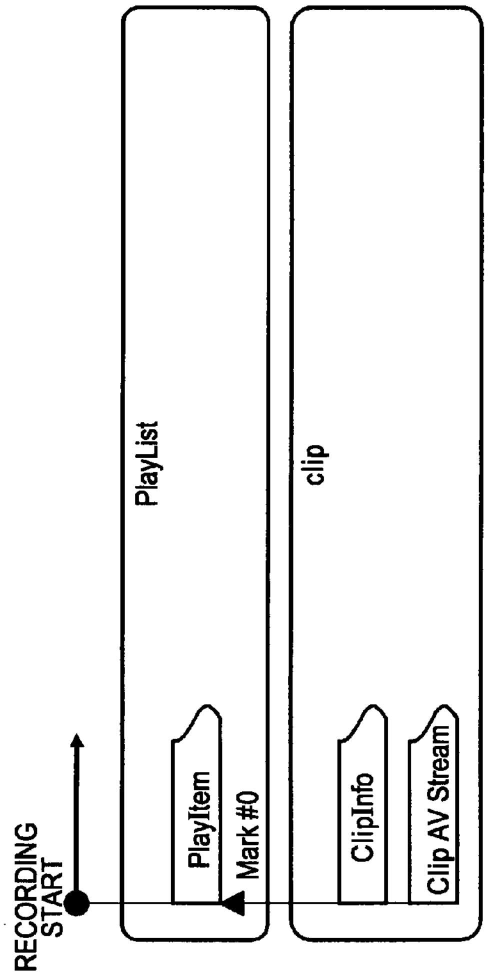
FIGS. 7A and 7B illustrate a procedure in accordance with which the play list is generated together with the clip of an audio-visual (AV) stream in step with photographing and recording operations of a video camera in accordance with one embodiment of the present invention.
Figure 7B:
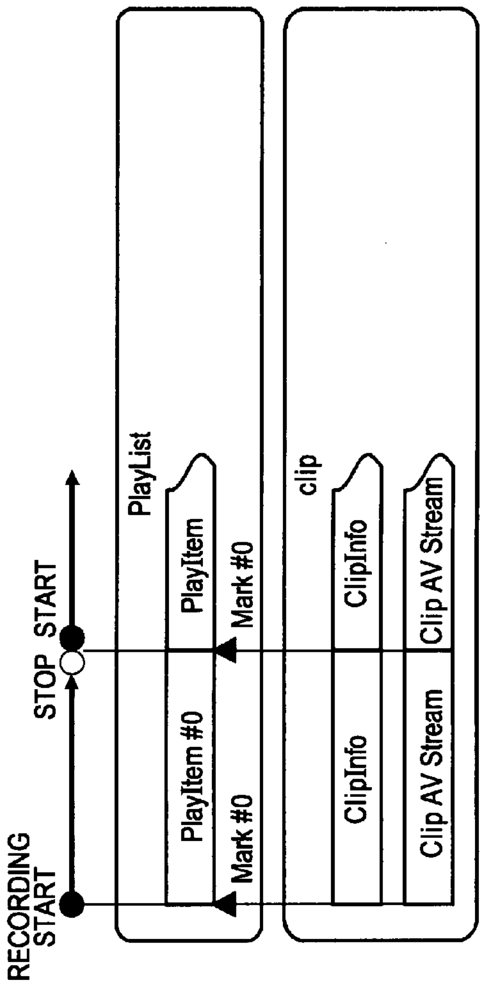
Figure 8A:
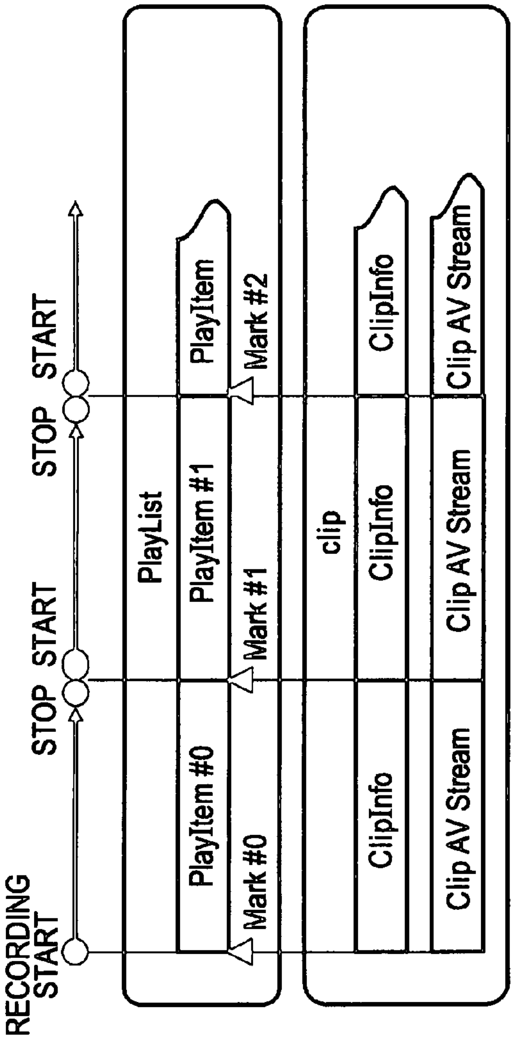
FIGS. 8A and 8B illustrate a procedure in accordance with which the play list is generated together with the clip of an AV stream in step with photographing and recording operations of the video camera in accordance with one embodiment of the present invention.
Figure 8B:
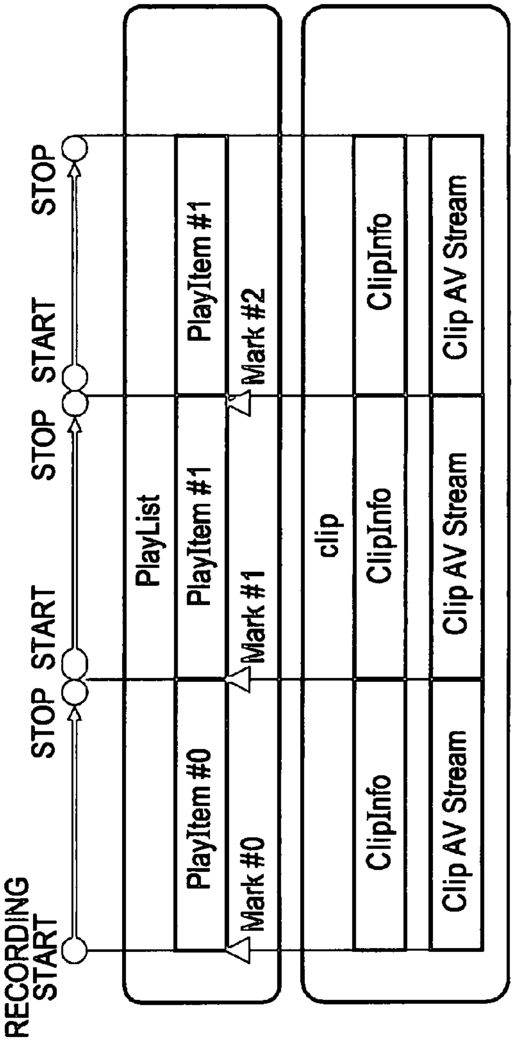

A management structure of a file to be recorded on the information recording medium 180 is described below with reference to FIG. 6. As described above with reference to FIGS. 2 through 4, the data to be recorded on the information recording medium 180 includes the MovieObject, the PlayList, and the clip. The clip includes the CipInformation file and clipAVStream file. The files are managed by layer. One directory (a root directory in FIG. 6) is created on the information recording medium 180. The directories under the root directory are a range controlled by a single recording and reproducing system.

Arranged under the root directory are a BDMV directory and an AVCHDTN directory. A thumbnail file having a representative image of a clip contracted to a predetermined size is arranged under the AVCHDTN directory. The data structure discussed with reference to FIG. 2 is stored under the BDMV directory.

Only two files, namely, an index.bdmv file and a Movieobject.bdmv file, can be arranged under the BDMV directory. The directories arranged under the BDMV directory are a PLAYLIST directory, a CLIPINF directory, a STREAM directory, and a BACKUP directory.

The content of the BDMV directory is described in the index.bdmv file. The MovieObject.bdmv file stores information regarding at least one movie object.

The PLAYLIST directory contains a database of the PlayList. More specifically, the PLAYLIST directory contains a play list file xxxxx.mpls as a file relating to a movie play list. The play list file xxxxx.mpls is created for each of the movie play lists. In the file name, "xxxxx" preceding the period (".") is a five digit number, and "mpls" following the period is an extension fixed to this type of file.

The CLIPINF directory contains a database of each clip. More specifically, the CLIPINF directory contains a clip information file "zzzzz.clpi" corresponding to each clipAvStream file. In the file name, "zzzzz" preceding the period (".") is a five digit number, and "clpi" following the period is an extension fixed to this type of file.

The STREAM directory contains an AV stream file as a body. More specifically, the STREAM directory contains a clip AV stream file corresponding to each clip information file. The clip AV stream file contains a moving picture experts group (MPEG) 2 transport stream (hereinafter referred to as MPEG2 TS), and has a file name "zzzzz.m2ts." In the file name, "zzzzz" preceding the period is identical to that of the corresponding clip information file to allow the correspondence between the clip information file and the clip AV stream file to be easily recognized.

The BACKUP directory contains backup data corresponding to the index.bdmv file, the MovieObject.bdmv file, the PLAYLIST directory, and the CLIPINF directory.

The AVCHDTN directory can contain two types of thumbnail files, namely, a thumbnail.tid1 file and a thumbnail.tid2 file. The thumbnail.tid1 file contains a thumbnail image encoded in accordance with a predetermined method. The thumbnail.tid2 file contains an unencoded thumbnail image. For example, a thumbnail image corresponding to a clip the user has photographed with a video camera is copy free and needs no encoding, and is thus contained in the thumbnail.tid2 file.

A generation process of generating the PlayList together with the AV stream in step with the photographing and recording of the video by the video camera is described below with reference to FIGS. 7A and 7B and FIGS. 8A and 8B.

FIGS. 7A and 7B and FIGS. 8A and 8B illustrate the generation process of the clip and the play list performed when the user starts and stops a recording process. As shown in FIGS. 7A and 7B and FIGS. 8A and 8B, one PlayItem is generated in a period from when the user starts the recording process to when the user stops the recording process. One clip AV stream file is generated in accordance with one session of the photographing and recording operation. Along with this session, the clip information file is also generated. One clip is a unit requiring reproduction under which continuous synchronized playing, namely, real-time playing is guaranteed.

Each time the user starts recording, an entry mark is attached to the head of the PlayItem. The entry mark in the PlayList is referred to as a PlayList mark (PLM). Within one PlayList, PlayItems and the marks are serially numbered. Although the head of each PlayList for a moving image must be tagged with the respective entry mark, a predetermined operation can shift the entry mark in time axis.

Each entry mark represents an entry position at which the user has accessed the stream. Periods, each period delimited by adjacent entry marks (and a period from last mark to the end of the final PlayItem) are "chapters" as a minimum editing unit viewed from the user. The play order of the PlayLists is defined by arranging both the PlayItems and the entry marks in the play order.

The file update process and the file recording process of the information processing apparatus 100 are described below. As previously discussed, the recording and reproducing controller 110 updates a Movieobject.bdmv file as a command storage file defined by the AVCHD format and an index.bdmv file at predetermined timings, more specifically, at one of timings of:

(a) ejection of the information recording medium 180, (b) USB connection of the recording and reproducing controller 110 with an external device such as a personal computer via the input-output interface 114, (c) unmount of the information recording medium 180, and (d) power off of the information processing apparatus 100.

The MovieObject.bdmv file and the index.bdmv file are updated at one of the above-described particular timings rather than the timings of the content recording and the editing of the recorded content. With this arrangement, a process to be performed at the data recording process and the data editing process is eliminated, and the information processing apparatus 100 can work efficiently. The MovieObject.bdmv file and the index.bdmv file are already updated when the content is reproduced. The content is thus reliably reproduced. Since the number of accesses to the medium is reduced, the degradation rate of the medium is improved.

As previously discussed, the AVCHD format defines the clip information file storing detailed information regarding the stream, the PlayList file storing brief playback information, the MovieObject.bdmv file storing a command for indicating the order and the start position at which the content is actually reproduced, and the index.bdmv file for causing the user to recognize as the title the reproducing procedure indicated by the movie object file.

For example, when the data recording process or the editing process is performed on a moving image, information relating to the clip information file and the PlayList file needs to be added or updated. Along with the addition or the update, the movie object file and the index file also need to be updated.

If the movie object file and the index file are updated each time the data recording process or the editing process is performed, performance of the information processing apparatus may drop. To avoid performance drop, these files are not updated at the data recording process or the data editing process. The files are updated at one of the above-described timings (a) through (d).

Figure 9:
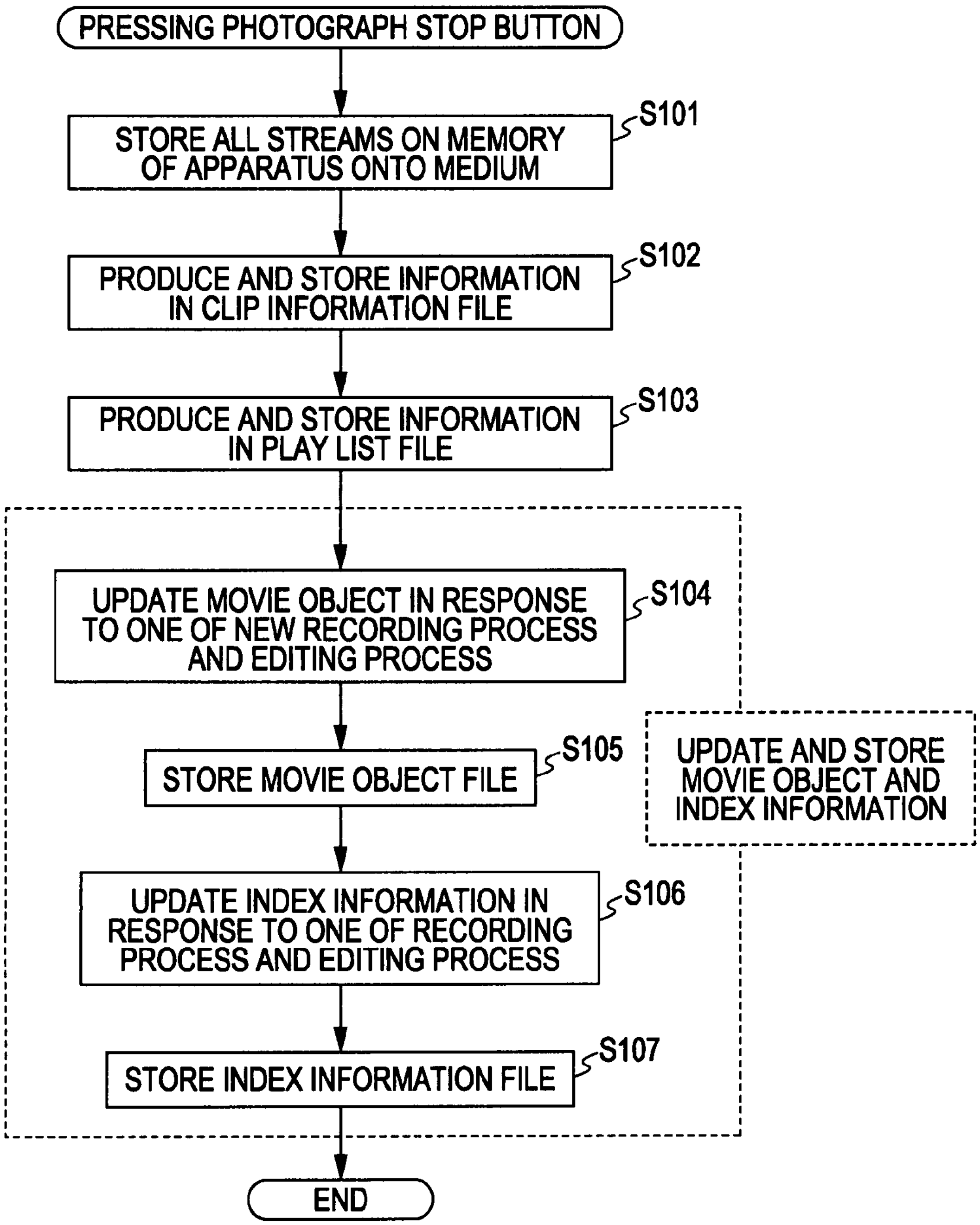
FIG. 9 is a flowchart illustrating a process sequence for updating and recording a movie object and index information during data recording and data editing.
Figure 10:
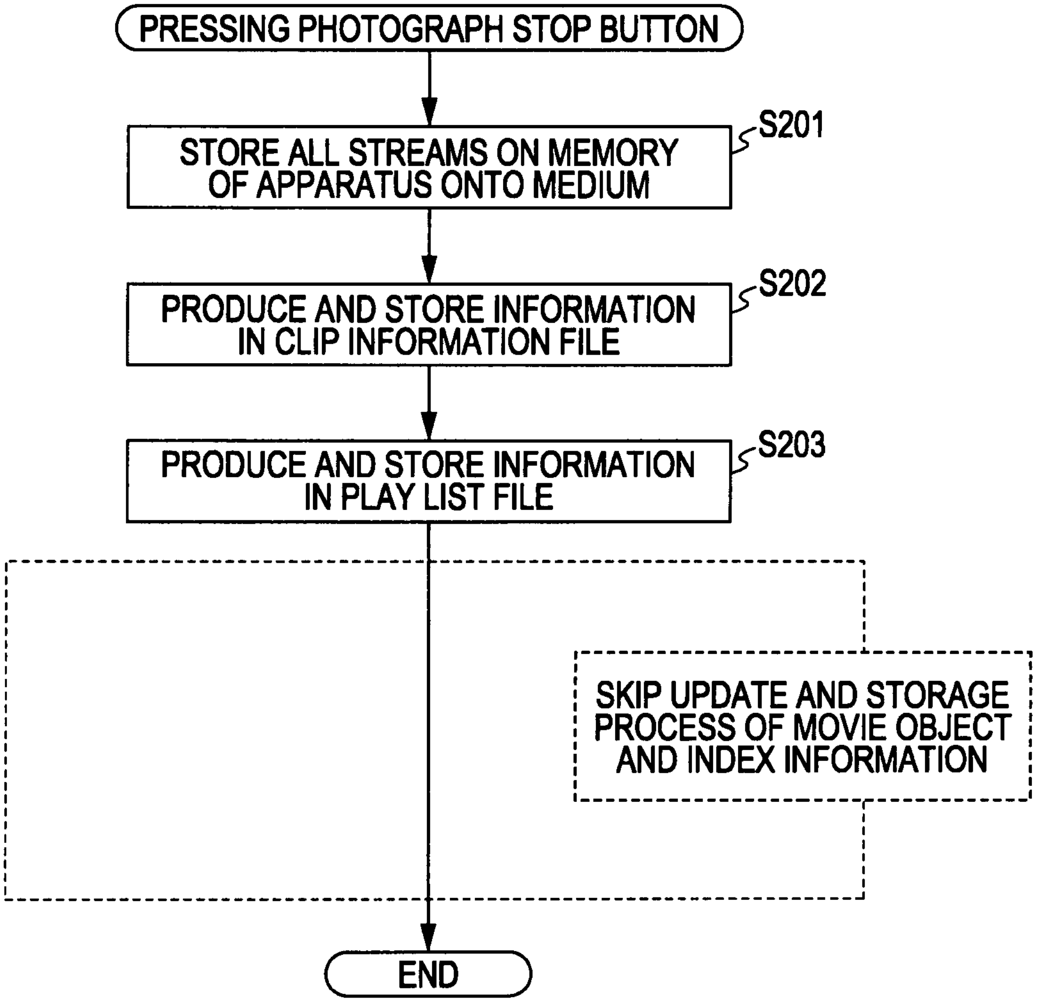
FIG. 10 is a flowchart illustrating a process sequence for neither updating nor recording the movie object and the index information during data recording and data editing in accordance with one embodiment of the present invention.

FIG. 9 illustrates the process sequence at which the movie object file and the index file are updated at each of the timings of the data recording process and the data editing process. FIG. 10 illustrates the process sequence of the information processing apparatus 100 of one embodiment of the present invention.

In step S101, all steam data, such as moving image content stored on the RAM 113, is recorded on the information recording medium 180. The stream data is an AV stream as real data corresponding to content newly photographed or content to be edited. In step S102, the information regarding the clip information file corresponding to the stream to be newly recorded or to be edited is produced and recorded on the information recording medium 180. In step S103, a PlayList file corresponding to the stream corresponding to the stream to be newly recorded or to be edited, or corresponding to the clip information file is produced and then recorded on the information recording medium 180.

Steps S104 through S107 correspond to the update and recording process of the movie object and the index information. In step S104, the movie object is updated in response to the new recording process or the editing process. In step S105, the updated Movieobject.bdmv file is recorded on the information recording medium 180. As previously discussed, the movie object file stores the command to define the play order and the start position of the content.

In step S106, the index information is updated in response to the new recording process or the editing process. In step S107, the updated index.bdmv file is stored on the information recording medium 180. As previously discussed, the index file stores the index information for causing the user to recognize as the title the reproduction procedure indicated by the movie object file.

FIG. 10 illustrates the process of the information processing apparatus 100. In this process, the update of the movie object file and the index file is skipped each time the data recording process or the data editing process is performed.

In step S201, all stream data, such as the moving image content stored on the RAM 113, is recorded on the information recording medium 180. The stream data is an AV stream as real data corresponding to content to be newly photographed or content to be edited. In step S202, the information regarding the clip information file corresponding to the stream to be newly recorded or to be edited is produced and recorded on the information recording medium 180. In step S203, a PlayList file corresponding to the stream corresponding to the stream to be newly recorded or to be edited, or corresponding to the clip information file is produced and then recorded on the information recording medium 180. After steps S201 through S203, the process of the information processing apparatus 100 ends.

The data recording process and the editing process are completed without performing the process corresponding to steps S104 through S107 of FIG. 9, namely, the update and storage process of the movie object and the index information. The information processing apparatus 100 simplifies the data recording and editing process, thereby performing efficient data recording and editing process.

As previously discussed, the recording and reproducing controller 110 updates the Movieobject.bdmv file and the index.bdmv file at one of the predetermined timings, more specifically, at one of the timings of:

(a) ejection of the information recording medium 180, (b) USB connection of the recording and reproducing controller 110 with an external device such as a personal computer via the input-output interface 114, (c) unmount of the information recording medium 180, and (d) power off of the information processing apparatus 100.

At the timing (b), the USB connection of the recording and reproducing controller 110 is established with the external device such as the personal computer via the input-output interface 114. With the USB connection, the application running on a personal computer recognizes the information recording medium 180 loaded on the information processing apparatus as an external storage unit (USB mass storage device) and records and acquires data on the information recording medium 180. At the timing (c), the information recording medium 180 is disconnected from the file system and ready to be unloaded.

Figure 11:
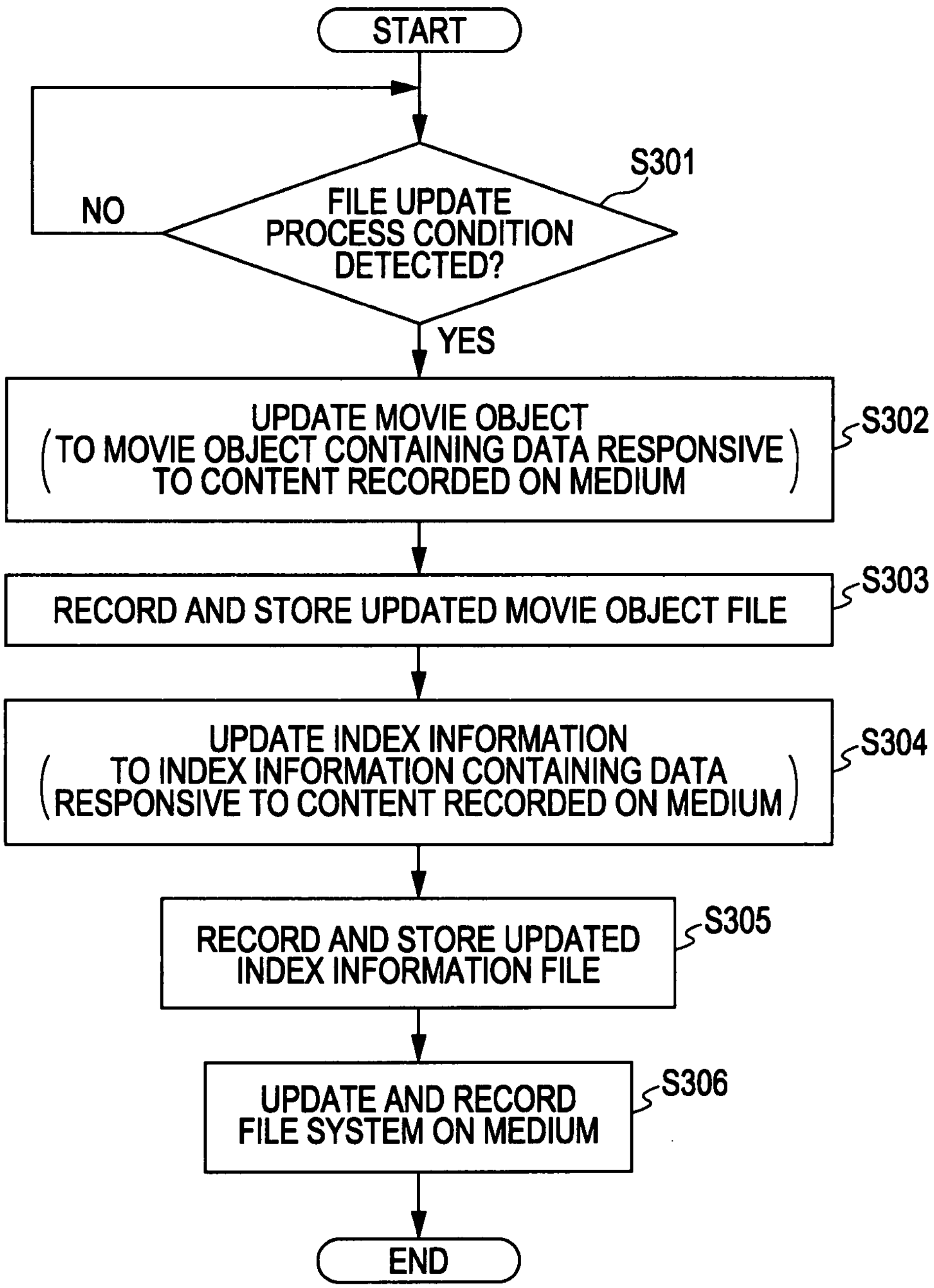
FIG. 11 is a flowchart illustrating a process sequence for updating and recording the movie object and the index information at a predetermined timing in accordance with one embodiment of the present invention.

The update and storage process of the movie object and the index information performed by the information processing apparatus 100 is described below with reference to a flowchart of FIG. 11. This process is performed under the control of the main controller 111 in the recording and reproducing controller 110 of FIG. 1.

In step S301, the main controller 111 determines whether a file update process condition has been detected. More specifically, the main controller 111 detects one of the events (a) ejection of the information recording medium 180, (b) USB connection of the recording and reproducing controller 110 with an external device such as a personal computer via the input-output interface 114, (c) unmount of the information recording medium 180, and (d) power off of the information processing apparatus 100 in response to a user operation, for example.

When the main controller 111 detects one of the events, processing proceeds to step S302. In step S302, the main controller 111 updates the movie object to have data corresponding to the content recorded on the information recording medium 180. More specifically, the main controller 111 updates the movie object to a movie object that accounts for the AV stream, the clip information file, and the PlayList file, each corresponding to the content recorded or the content edited after last update of the movie object. In step S303, the updated Movieobject.bdmv file is recorded on the information recording medium 180.

In step S304, the main controller 111 updates the index information to index information having data corresponding to the content recorded on the information recording medium 180. More specifically, the main controller 111 updates the index information to index information that accounts for the AV stream, the clip information file, and the PlayList file, each corresponding to the content recorded or the content edited after last update of the movie object, and also accounts for the update movie object. In step S305, the updated index.bdmv file is recorded on the information recording medium 180. In step S306, the file system on the information recording medium 180 is updated and recorded. Processing thus ends. After these steps, the event detected in step S301, namely, one of the ejection operation, the USB connection operation, the unmount operation, and the power-off operation is executed.

Each of the movie object file as the command storage file and the index file, before recording thereof on the information recording medium 180, is updated to have data consistent with all AV streams recorded on the information recording medium 180.

When the information recording medium 180 is unloaded and then set onto a reproducing apparatus for playing, the Movieobject.bdmv file and the index.bdmv file is already in updated versions thereof supporting all content on the information recording medium 180. The information recording medium 180 is thus reliably played in a manner free from reproduction error.

The data update process of the index.bdmv file and the MovieObject.bdmv file is described below with reference to a flowchart of FIG. 12. As previously discussed with reference to FIG. 2, the index file, the movie object file, the PlayList file, the clip information file, and the clip AV stream file are generated and recorded in accordance with the AVCHD format.

The PlayList and the clip information are updated successively at the recording and editing of the AV stream. The index and the movie object are updated together at a particular timing. More specifically, the index.bdmv file 281 and a Movieobject.bdmv file 282 are updated in the data format of FIG. 12 at particular timings. Using syntaxes of FIG. 13 and other drawings, the update process of the files is discussed below. The syntaxes of FIG. 13 and other drawings are those of the index.bdmv file and the MovieObject.bdmv file, and described using C language typically used to describe programs of computers. The index file, the movie object file, and the PlayList file, set as shown in FIG. 12, are now updated.

FIG. 13 illustrates the syntax of the index.bdmv file. The index.bdmv file contains type information "TypeIndicator" indicating that this file is an index file. The type information "TypeIndicator" is followed by start address information "IndexesStartAddress" and "ExtensionDataStartAddress" of actual data, and recording fields "blkApplInfoBDMV ( )"—"blkExtensionData( )" of actual data recorded in the index file.

As described with reference to the flowchart of FIG. 11, the index file required in the content recording and editing is updated and recorded on the information recording medium 180 in steps S304-S305. The index.bdmv file stores the index information such as the title. When the content recording and editing process is performed, index information corresponding to the title accounting for the process is added.

As shown in FIG. 13, the index.bdmv file contains, as the actual data, an application information block "ApplInfoBDMV( )," an index information block "Indexes( )" 301, and an extension data block "blkExtensionData( )" 302. These pieces of information are updated in step S304 in the flowchart of FIG. 11.

FIG. 14 illustrates a syntax of the index information block "Indexes( )" 301 of FIG. 13. For example, information relating to a first playback "FirstPlayback" 291 in the index file "Index.bdmv" 281 of FIG. 12 is recorded in a field 311 of the index information block "Indexes( )" of FIG. 14, and information relating to a top menu "TopMenu" 291 in the index.bdmv file 281 is recorded in a field 312 of the index information block "Indexes( )" of FIG. 14. The PlayList for the first playback is a PlayList called and executed at the startup of the information recording medium 180. The PlayList for the top menu is a PlayList called and executed in a menu display process. The index information is organized so that the PlayLists are executed as described above.

Type information <01> indicating a menu title corresponding to a menu reproduced at the startup is recorded in an AVCHD title playback type field "AVCHDTitlePlaybackType" contained in the field 311 of the index information block "Indexes( )" of FIG. 14. Here, <xxx> represents information or description provided in each field. The same is true of the following syntaxes. An identifier <0000> of a movie object specified by the first playback "FirstPlayback" 291 in the index.bdmv file 281 of FIG. 12 is recorded in a first playback movie object ID field "FirstPlayback_mobj_id_ref" contained in the field 311 of the index information block "Indexes( ) 301."

Figure 12:
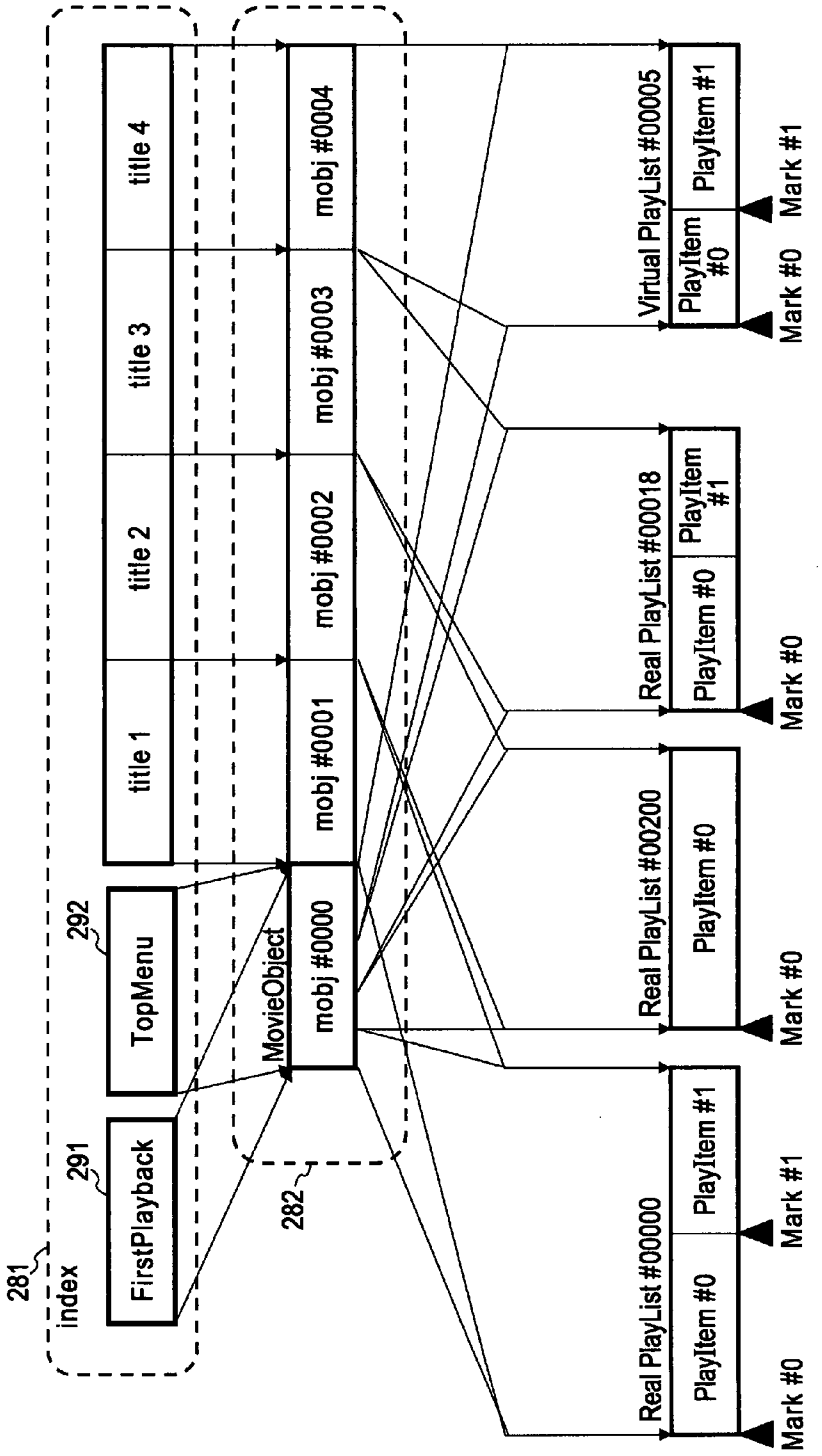
FIG. 12 illustrates an update process of the movie object and the index information in accordance with one embodiment of the present invention.

Similarly, an identifier <0000> of a movie object specified by the top menu "TopMenu" 292 in the index.bdmv file 281 of FIG. 12 is recorded in a top menu movie object ID field "TopMenuPlayback_mobj_id_ref" contained in the field 312 of the index information block "Indexes( )." In this case, the movie object specified by the first playback "FirstPlayback" 291 in the index.bdmv file 281 of FIG. 12 and the movie object specified by the top menu "TopMenu" 292 in the index.bdmv file 281 of FIG. 12 have the same movie object having <0000>.

The number of title <4> contained in the index.bdmv file 281 of FIG. 12 is recorded in the number of title field "number_of_Title" in the index information block "Indexes( )" of FIG. 14. An identifier of a movie object specified by each title contained in the index.bdmv file 281 of FIG. 12 is recorded in a title movie object ID field "Title_mobj_is_ref[title id]".

FIG. 15 illustrates a syntax of an extension data block "blkExtensionData( )" 302 in the index.bdmv file of FIG. 13. A variety of extension data that cannot be described in the other blocks within the index information is described in the extension data block "blkExtensionData( )" 302.

New data may be recorded in the update process of the index information. For example, the number of entries <1> is recorded in an number of extension data entries field "number_of_ext_data_entries." As shown in FIG. 15, a value as the extension data indicating the format information "AVCHD" of the recorded data is recorded in an ID1 field set as an identification information data field, and version information is recorded in an ID2 field. A variety of extension data is recorded in a data block 321.

FIG. 16 illustrates an example of the data block 321. Maker private data can be recorded in the data block 321. As shown in FIG. 16, the data block 321 contains a UI application information block "UIAppInfoAVCHD( )" 351, a play list table information block "TableOfPlayLists( )" 352, and a maker private data block "MakersPaivateData( )" 353.

FIG. 17 illustrates a specific example of the UI application information block "UIAppInfoAVCHD( )" 351. Information relating to a person who updated last the data recorded on the information recording medium 180, and last update process information are recorded in the UI application information block "UIAppInfoAVCHD( )" 351. Maker ID as information relating to apparatus having performed last update process is recorded in a maker ID "makerID" field, and a model code is recorded in a maker model code "maker_model_code" field. Further recorded in the UI application information block "UIAppInfoAVCHD( )" 351 is last update date and time information.

FIG. 18 illustrates an example of the play list table information block "TableOfPlayLists( )" 352 of FIG. 16 in the extension data block of the index file. Information related to the PlayList is recorded in the play list table information block "TableOfPlayLists( )" 352. The number of play lists <4> is recorded in the number of title play lists field "number_of_Title_Playlist_pair". The word pair means a pair of play list and title. A play list file number is recorded in a play list file name field "PlayList_file_name". In the case of FIG. 12, play list identifiers "00000, 00200, 00018, 00005" are recorded.

Attribute information indicating whether each PlayList is a real PlayList or a virtual PlayList is recorded in a play list attribute field "PlayList_attribute". More specifically, real PlayList="0" or virtual PlayList="1" is recorded. In the case of FIG. 12, "01, 01, 01, 10" are recorded. Play order information of the PlayList is recorded in a title ID reference field "ref_to_title_id".

FIG. 19 illustrates the first playback and the top menu play list information field 371 contained in the play list table information block "TableofPlayLists( )" in the extension data block of the index file of FIG. 18. Information such as a menu displayed first at the play of the medium is recorded. If the PlayList for the menu is produced, <1> is recorded in the number of play list field "number_of_Playlist," and if the PlayList for the menu is not produced, <0> is recorded in the same field.

FIG. 20 illustrates an example of the maker private data block "MakersPaivateData( )" 353 of FIG. 16 in the extension data block of the index file. The ID of the maker and the model code are recorded in the maker private data block "MakersPaivateData( )" 353. If the maker private data block "MakersPaivateData( )" 353 is not used, <0> is set in a data length field "length," and if the maker private data block "MakersPaivateData( )" 353 is used, a data length of used data is recorded in the data length field "length."

The update process of the movie object is described below. FIG. 21 illustrates a syntax of the movie object file. As previously discussed with reference to the flowchart of FIG. 11, the movie object file required to record or edit content is updated and then recorded on the information recording medium 180 in steps S302 and S303. A command for the reproducing process using the PlayList is stored in the Movieobject.bdmv file. When the content recording and editing process is performed, an update process such as the addition of a command responsive to the content recording and editing process is performed.

As shown in FIG. 21, the movie object file "MovieObject.bdmv" contains, as actual data, a movie object block "Movieobjects( )" 401 and an extension data block "blkExtensionData( )." FIG. 22 illustrates a syntax of the movie object block "Movieobjects( )" 401.

As the content is recorded or edited, the number of updated movie objects is recorded in the number of movie objects field "NumberOfmobjs" in the movie object block "MovieObjects( )" 401 of FIG. 22. In the example of FIG. 12, the number of movie objects <5> is recorded. The number of navigation commands set in each movie object is recorded in the number of commands field "number_of_navigation_commands [mobj_id]".

In the setting of FIG. 12, a movie object "mobj#0000" stores four commands for consecutively reproducing four PlayLists PlayList #00000, PlayList #00200, PlayList #00018 and PlayList #00005 in that order. A movie object "mobj#0001" stores one command for reproducing the PlayList 00000, a movie object "mobj#0002" stores one command for reproducing the PlayList #00200, a movie object "mobj#0003" stores one command for reproducing the PlayList 00018, and a movie object "mobj#0004" stores one command for reproducing the PlayList #00005. The number of navigation commands <4, 1, 1, 1, 1> for the movie objects is recorded in the field "number_of_navigation_commands [mobj_id]."

As shown in FIG. 12, the movie object "mobj#0000" is specified by the first playback and the top menu. When the reproducing process is performed from the first playback and the top menu, the command of the movie object "mobj#0000" applies. All PlayLists are successively reproduced. When the reproducing process is performed with titles 1-4 "title1-4" applied, one command contained in each of the movie objects #0001-#0004 selects one PlayList and the content specified by the selected PlayList is reproduced.

The information processing apparatus of embodiments of the present invention does not update the MovieObject.bdmv file and the index.bdmv file at the data recording process and the data editing process. Alternatively, the information processing apparatus updates the MovieObject.bdmv file and the index.bdmv file at one of the timings of (a) ejection of the information recording medium 180, (b) USB connection of the recording and reproducing controller 110 with an external device such as a personal computer via the input-output interface 114, (c) unmount of the information recording medium 180, and (d) power off of the information processing apparatus 100. The data recording process and the data editing process are thus simplified and efficiently performed. When the content is reproduced from the information recording medium 180 on the reproducing apparatus, the movie object and the index file are already updated. Reliable reproducing is thus performed. The number of file updates is reduced, leading to a reduction in the number of medium accesses. The medium degradation is thus improved.

The present invention has been discussed with reference to specific embodiments. It will be apparent to those skilled in the art that changes and modifications are made to the present invention without departing from the scope of the present invention. The embodiments of the present invention have been discussed for exemplary purposes only, and are not intended to limit the scope of the present invention. The scope of the present invention is to be limited by the appended claims only.

The above-referenced series of process steps may be performed using hardware, software or a combination thereof. If the process steps are performed using software, a program of the software may be installed from a recording medium onto a computer built in dedicated hardware or a general-purpose personal computer enabled to perform a variety of functions with a variety of programs installed thereon.

The program may be pre-stored on a hard disk or a ROM. The program may also be stored (recorded) temporarily or permanently on a removable recording medium such as a flexible disk, a compact disk read-only memory (CD-ROM), a magneto-optical (MO) disk, a digital versatile disk (DVD), a magnetic disk, or a semiconductor memory. Such a removable disk may be supplied as package software.

The program may be installed on the computer from the above-mentioned removable recording medium. Alternatively, the program may be transmitted from a download side to the computer in a wireless fashion or a wired fashion using a network such as the Internet. The computer receives such a transmitted program, and installs the program onto a recording medium such as a built-in hard disk.

The process steps describing the program may be performed in the time-series order sequence as previously stated. Alternatively, the process steps may be performed in parallel or separately. In the context of this specification, the system refers to a logical set of a plurality of apparatuses and is not necessarily a single apparatus in a single casing.

What is claimed is:

1. An information processing apparatus comprising a controller for controlling data recording to an information recording medium, the controller updating a command storage file storing a command set in response to AV stream data to be recorded on the information recording medium and an index file storing at least index information, last update and time information, information indicating a person last updating data recorded on the information recording medium and information indicating an ID of a maker of an apparatus having performed a last update process, and then recording the updated command storage file and the updated index file on the information recording medium, the command storage file and the index file being updated and recorded in response to a determination that a predetermined update process event is detected, the predetermined update process event not being the recording of the AV stream data onto the information recording medium and the editing of the recorded AV stream data at which the controller does not update the command storage file and the index file, wherein the predetermined update process event is executed after the command storage file and the index file are updated and recorded by the controller responsive to the determination that the predetermined update process event is detected.

2. The information processing apparatus according to claim 1, wherein the controller detects the predetermined update process event which is at least one of an ejection of the information recording medium, a connection of the information processing apparatus to an external device via an input-output interface, an unmount of the information recording medium, and a power-off of the information processing apparatus, and updates and then records the command storage file and the index file onto the information recording medium in response to a detection result that the predetermined update process event is detected.

3. The information processing apparatus according to claim 1, wherein the controller updates the command storage file and the index file to store data consistent with all AV streams recorded on the information recording medium, and then records the updated command storage file and the updated index file onto the information recording medium.

4. The information processing apparatus according to one of claims 1 through 3, wherein the command storage file comprises a movie object file defined by an AVCHD format, and wherein the index file is defined by the AVCHD format.

5. An information processing method comprising a step of controlling data recording to an information recording medium, the controlling step including updating a command storage file storing a command set in response to AV stream data to be recorded on the information recording medium and an index file storing at least index information, last update and time information, information indicating a person last updating data recorded on the information recording medium and information indicating an ID of a maker of an apparatus having performed a last update process, and then recording the updated command storage file and the updated index file on the information recording medium, the command storage file and the index file being updated and recorded in response to a determination that a predetermined update process event is detected, the predetermined update process event not being the recording of the AV stream data onto the information recording medium and the editing of the recorded AV stream data at which the command storage file and the index file are not updated, wherein the predetermined update process event is executed after the command storage file and the index file are updated and recorded responsive to the determination that the predetermined update process event is detected.

6. The information processing method according to claim 5, wherein the controlling step comprises detecting the predetermined update process event which is at least one of an ejection of the information recording medium, a connection of the information processing apparatus to an external device via an input-output interface, an unmount of the information recording medium, and a power-off of the information processing apparatus, and updating and then recording the command storage file and the index file onto the information recording medium in response to a detection result that the predetermined update process event is detected.

7. The information processing method according to claim 5, wherein the controlling step comprises updating the command storage file and the index file to store data consistent with all AV streams recorded on the information recording medium, and then recording the updated command storage file and the updated index file onto the information recording medium.

8. The information processing method according to one of claims 5 through 7, wherein the command storage file comprises a movie object file defined by an AVCHD format, and wherein the index file is defined by the AVCHD format.

9. A non-transitory computer-readable memory having stored thereon a computer program for causing a computer to process information, comprising a step of controlling data recording to an information recording medium, the controlling step including updating a command storage file storing a command set in response to AV stream data to be recorded on the information recording medium and an index file storing at least index information, last update and time information, information indicating a person last updating data recorded on the information recording medium and information indicating an ID of a maker of an apparatus having performed a last update process, and then recording the updated command storage file and the updated index file on the information recording medium, the command storage file and the index file being updated and recorded in response to a determination that a predetermined update process event is detected, the predetermined update process event not being the recording of the AV stream data onto the information recording medium and the editing of the recorded AV stream data at which the command storage file and the index file are not updated, wherein the predetermined update process event is executed after the command storage file and the index file are updated and recorded responsive to the determination that the predetermined update process event is detected.

* * * * *